No. 737,263. PATENTED AUG. 25, 1903.
O. N. MOORE.
FARE REGISTER.
APPLICATION FILED OCT. 25, 1902.
NO MODEL. 3 SHEETS—SHEET 1.

WITNESSES:
Rayden Lesley
S Mahlon Unger

INVENTOR.
Otto N. Moore,
BY Joseph A. Minturn
ATTORNEY.

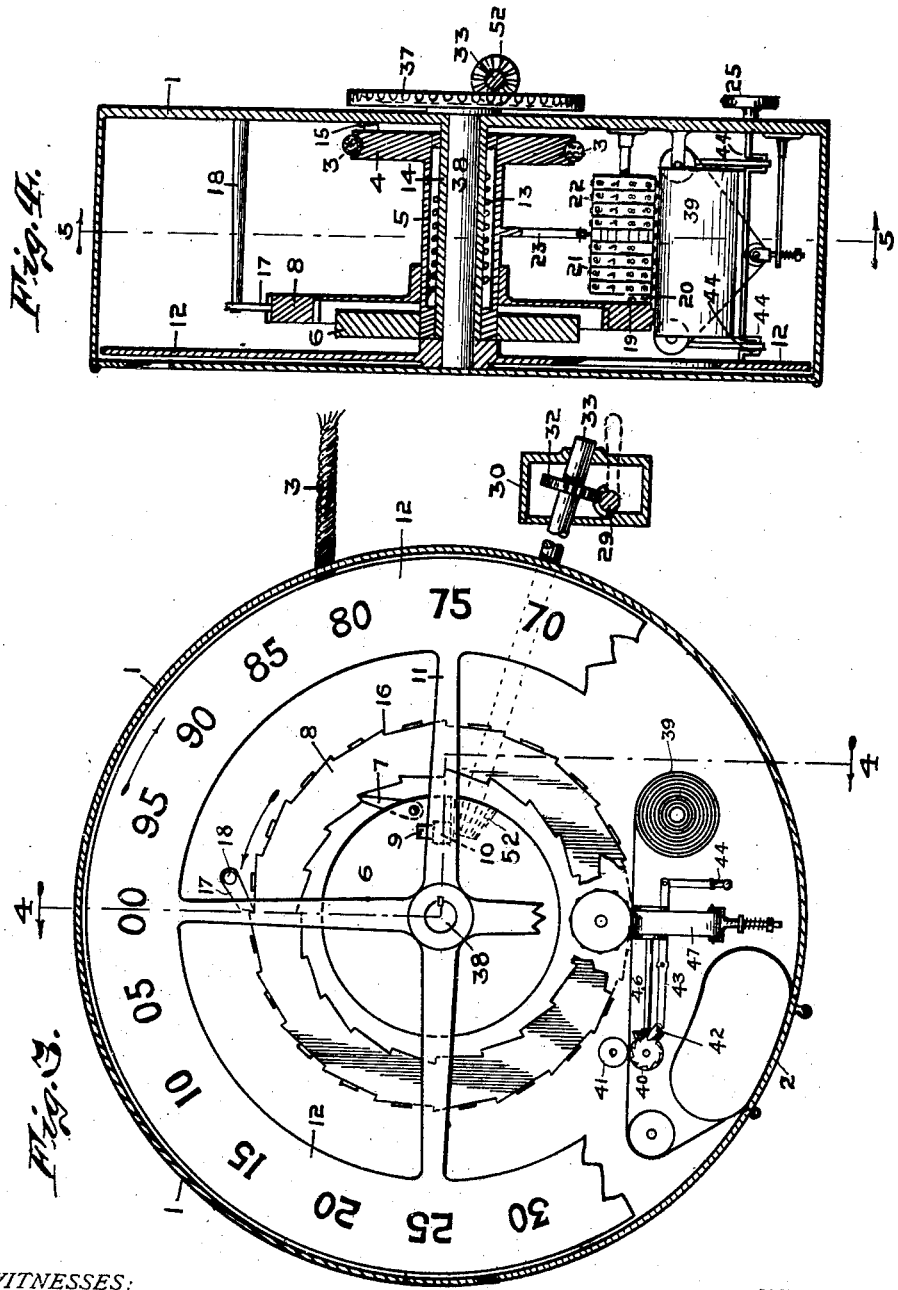

No. 737,263. PATENTED AUG. 25, 1903.
O. N. MOORE.
FARE REGISTER.
APPLICATION FILED OCT. 25, 1902.
NO MODEL. 3 SHEETS—SHEET 3.

WITNESSES:
Bayden Lesley
D Mahlon Unger

INVENTOR.
Otto N. Moore,
BY Joseph A. Minturn
ATTORNEY.

No. 737,263. Patented August 25, 1903.

UNITED STATES PATENT OFFICE.

OTTO N. MOORE, OF INDIANAPOLIS, INDIANA.

FARE-REGISTER.

SPECIFICATION forming part of Letters Patent No. 737,263, dated August 25, 1903.

Application filed October 25, 1902. Serial No. 128,703. (No model.)

*To all whom it may concern:*

Be it known that I, OTTO N. MOORE, a citizen of the United States, residing at Indianapolis, in the county of Marion and State of Indiana, have invented certain new and useful Improvements in Fare-Registers, of which the following is a specification.

This invention relates to improvements in fare and passenger registers; and the object of the invention is to indicate to the passenger the amount of fare paid by each passenger, also to compute and register the aggregate fares paid and the number of said fares regardless of the amount of the fare.

The further object is to provide a simple, durable, and easily-operated device which has a printing attachment to take off the readings of the indicator whenever desired.

I accomplish the objects of the invention by the mechanism illustrated in the accompanying drawings, in which—

Figure 1:
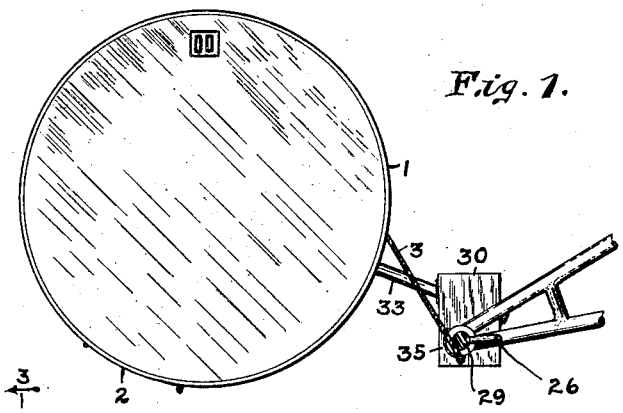
Figure 2:
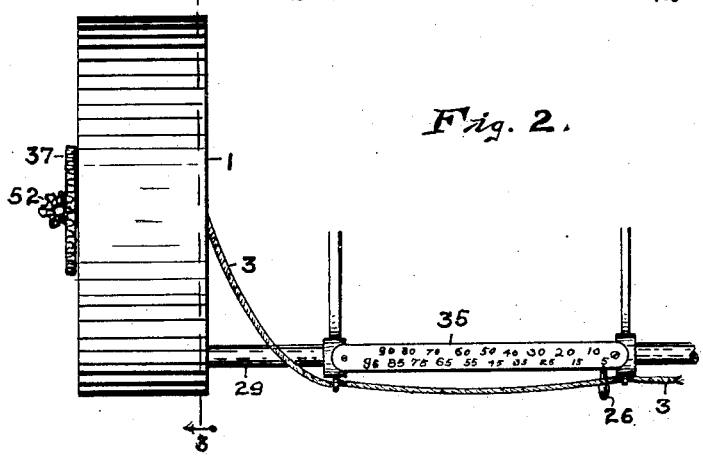
Figure 9:
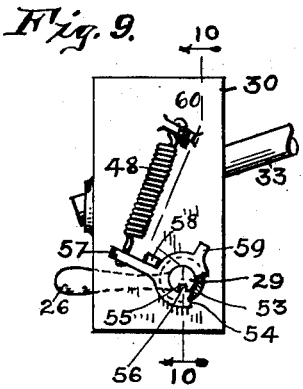
Figure 10:
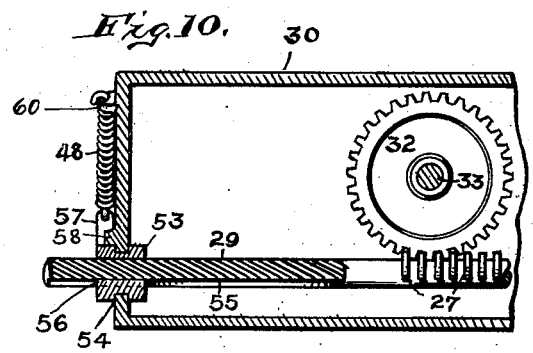
Figure 5:
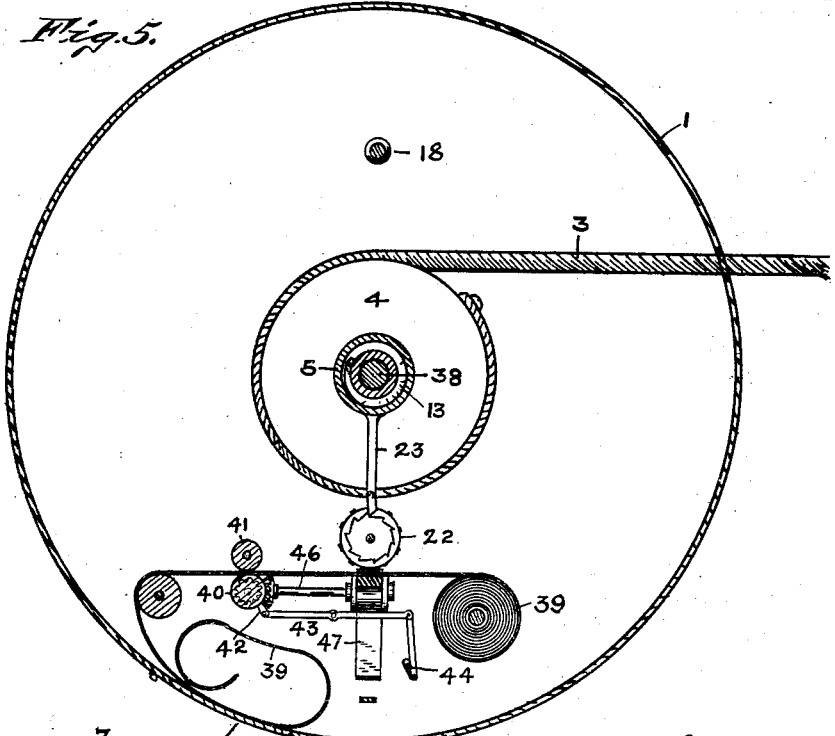
Figure 6:
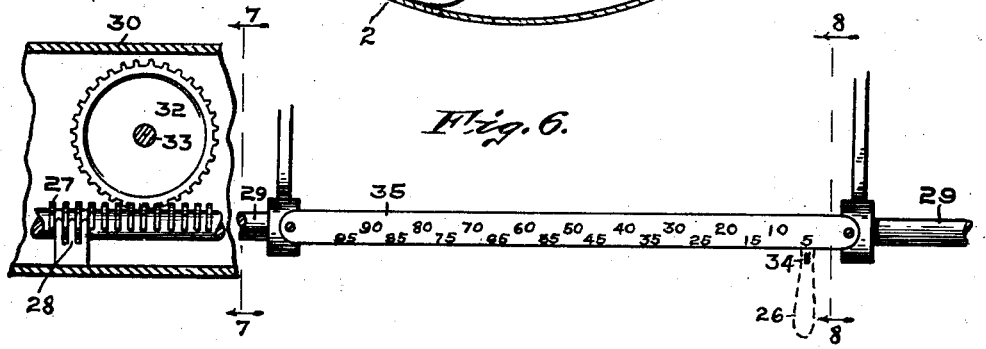
Figure 7:
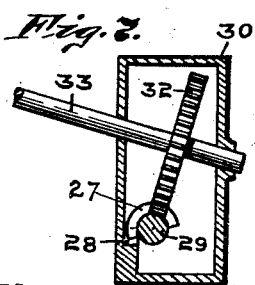
Figure 8:
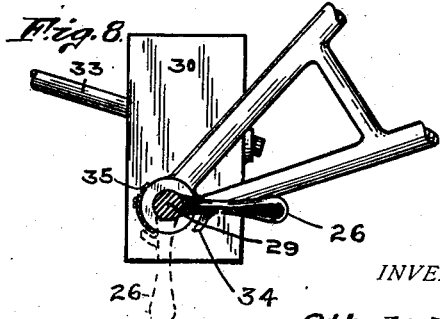

Figure 1 is a front elevation of my invention; Fig. 2, a side view of same; Fig. 3, a vertical section on the dotted line 3 3 of Fig. 2, showing parts of the mechanism broken away to reveal the interior construction; Fig. 4, a section on the dotted line 4 4 of Fig. 3; Fig. 5, a vertical section on the dotted line 5 5 of Fig. 4; Fig. 6, a detail in side elevation and partial vertical section of the bar placed longitudinally of the car for operating the indicator; Fig. 7, a section on the line 7 7 of Fig. 6; and Fig. 8 a section on the line 8 8, also of Fig. 6, both looking in the direction of the arrows; Fig. 9, an outer end view of the gearbox at the end of the shifting-bar at the side of the car, and Fig. 10 a section of same on the line 10 10 of Fig. 9.

Like characters of reference indicate like parts throughout the several views of the drawings.

1 is a case, preferably of metal and as near dust-proof as possible, within which the register mechanism is located. It has an under side door 2 to afford access to the printing device, which will be hereinafter described. Connected with the internal mechanism of the case and extending thence out and through the car within easy reach of the conductor is the cord 3.

The inside back of the case 1 supports the fixed sleeve 14, and mounted on said sleeve is the revoluble sleeve 5, having the fixed pulley 4, around which the cord 3 is wrapped one turn and to which the cord is then fastened. The opposite or front end of the sleeve 5 carries the fixed wheel 6, which has the pawl 7, adapted to engage the internal ratchets of a wheel 8, mounted loosely on the sleeve 5. Mounted in sleeve 14 is a shaft 38, having an end projecting at the back of the case, upon which is mounted the bevel-wheel 37, and mounted upon the inner or front end of said shaft is a register-wheel 12, having numbers from "00" to "95" in plain characters marked on the side of its rim and adapted to show consecutively through an opening at the top of the case through an opaque plate or shield in front of the register-wheel. One of the spokes 11 of the wheel 12 has a lug 10 on its inner side in the path of a lug 9 on the adjacent face of the wheel 6. When a fare is to be registered, the wheel 12 is rotated by mechanism, presently to be described, to a position which brings the amount of the fare into view through the above-mentioned opening in the opaque shield, and there the wheel 12 stands until the next fare is registered. The movement of wheel 12 carries its spoke 11, having lug 10, to a new position, and when the wheel 6 is moved by a pull on the cord 3 said wheel will be stopped by the contact of its lug 9 with the said lug 10, and upon the release of cord 3 the wheel 6 will return to a normal position by the action of the spring 13. This normal position is determined by a stop 15 from the back of the case, which arrests the pulley-wheel 4. The return of the wheel 6 carries the wheel 8 with it by the engagement of the dog or pawl 7 with the internal ratchets of said wheel 8. The wheel 8 has peripheral raised numbers reading from "00" to "95," corresponding with those of the wheel 12. Between said numbers are ratchets or notches to engage a dog 17, which is supported by the post 18, the purpose of which is to prevent the backward movement of the wheel 8. Opposite numeral "95" on the wheel 8 is a pin 19, which contacts with a suitable lug 20 on the units-disk 21 of a series of computing-disks, here shown as four in number, which register the total cash fares in dollars up to nine thousand nine hundred and ninety-nine dollars, the fractions of a dollar being registered on said wheel 8. The operation and construction of these disks are usual and well known and need not be here described. Preferably mounted for convenience on the same shaft are the four disks 22 to register the number of passengers. The units-disk of this series has a notched periphery, which gives engagement to an oscillating arm 23, fixed to sleeve 5, which makes a single stroke upon the rocking of the sleeve 5 by a pull on the cord 3. This arm has a jointed lower end, which allows the arm to make the return stroke without moving the disk, and for each stroke of the arm a passenger is registered regardless of the amount of the fare paid by him.

At the end of a day's run or upon a change of conductors the total amount of fares registered and the number of passengers carried may be printed upon a paper ribbon by turning the hand-wheel 25. This printing device is of usual construction and need not be specifically described. The essential features, however, include the roll of paper 39, one end of which is carried under the raised numerals or type on the disks and thence between the feed-rollers 40 and 41. The shaft which carries the roller 40 has a ratchet-wheel, which is engaged by the dog 42 on the lever 43, and the latter is oscillated by link connection with the cranks 44 on the same shaft with the hand-wheel 25. The shaft of the roller 40 also has a bevel-pinion 45, which drives a pinion on the shaft 46, and the latter has a roller over which passes an inked ribbon 47. The latter is moved transversely of the paper between it and the type.

I will now describe the initial movement of the wheel 12, which sets the stops to control the movement of the indicator under the influence of the cord.

29 is a shaft running lengthwise of the car and located at the side or other suitable place of said car. It is supported by suitable brackets and has longitudinal as well as rotary movement. At its end next to the register it has a series of annular ribs, like the threads of a screw, except that they are not set spirally of the shaft. Said ribs extend only part way—say two-thirds of the way—around the shaft and form a rack and bar 27 to engage the teeth of a cog-wheel 32, mounted on shaft 33, which runs toward the center of the register at the back of the latter and terminates with the bevel-wheel 52. This wheel 52 engages wheel 37 on the shaft 38, carrying the wheel 12. The shaft 29 has the handle 26, which stands normally in a horizontal position by the action of the spring 48, (see Figs. 9 and 10,) and when the handle is in said horizontal position the rack-teeth 27 are in engagement with the teeth 28 of the housing 30 of the adjacent end of shaft 29; but when said handle is drawn down into a vertical position, as when grasped by the conductor to register a fare, the shaft is rocked to release said rack-teeth and allow the shaft to be moved longitudinally. When so released, the shaft is moved longitudinally until the indicator 34 of said handle is opposite the number on a plate 35, designating the amount of fare received from the passenger. The plate 35 is supported parallel with the shaft and in front of it and has numbers from "00" to "95," corresponding with the numbers on the wheel 12 and with said register 12 provides a double indicator of the fares paid.

The shaft 29 has a bearing in the sleeve 53. The latter has a circumferential groove 54 to receive the end of the housing and permit rotary but not longitudinal movement of said sleeve. The shaft has a key-seat 55 and the sleeve has a spline 56, taking in said key-seat, thereby compelling the shaft and sleeve to rotate together. The outer end of the sleeve has an arm 57, which is connected by the spring 48 with a lug 60, integral with the end of the housing 30. The rotation of the shaft by the action of the spring is limited by the lug 58, which is integral with the housing 30. The rocking movement in opposition to the spring 48 is by a downward pull on the handle 26, limited by a lug 59 from said sleeve which strikes the lug 58.

Having thus fully described my invention, what I claim as new, and wish to secure by Letters Patent, is—

1. In a register and indicator, a revoluble wheel having an index and a projection from its inner side, a stationary shield having an opening through which only one character or group of characters of the index can be seen at a time, means for moving the wheel to a position exposing through the opening of the shield the amount of fare paid, a series of computing-disks having peripheral type-numerals, a second wheel having peripheral type-numerals up to "99," said wheel imparting a one-tenth revolution to its adjacent computing-disk at each revolution of its own, a third wheel having a projection adapted to contact with the projection of the first wheel, means for rotating said third wheel until it is arrested by contact with the lug of said first wheel, means for returning the third wheel to a normal position, means connecting the third wheel with the second wheel to cause the second wheel to move with the third wheel on the return of said third wheel to a normal position and means for taking a printed impression from a given row of type-numerals of the computing-disks and second wheel.

2. In a register and indicator, a case having a hollow cylinder projecting inwardly from its back, a second hollow cylinder or sleeve mounted on the first, a spiral spring between and connecting the two cylinders, a pulley mounted on said sleeve having a cable wrapped around its periphery and extending outside of said case whereby said pulley may be rotated, a stop to arrest the pulley at a given position on its return by the action of the spring, a wheel mounted loosely on said second cylinder or sleeve having internal and external ratchets and raised type-numerals on the periphery of the wheel, a pawl engaging the outside ratchets to prevent back motion, a series of computing-disks having peripheral type characters and connected with each other and with said loosely-mounted wheel whereby a revolution of one, starting with said loose wheel, will move the next adjacent disk one-tenth of a revolution, a wheel carrying a pawl to engage the internal ratchets of the loosely-mounted wheel mounted in a fixed manner on the said second cylinder, said pawl-wheel having a projection on its outer side, a spindle mounted on the first hollow cylinder having means at the back of the case for rotating it, a wheel mounted on its front end having the index characters to be shown by the indicator, said wheel having a projection to engage that of the pawl-wheel, means for covering all but a single character or group of characters of said index and means for taking the readings of a given row of said type characters.

3. A wheel having index characters, means for covering all but one character or group of characters of said index, said wheel having a projection to form a stop, a sleeve around the shaft of said wheel, a wheel mounted on said sleeve having a projection to contact with that of the first wheel and having a pawl, means for rocking said sleeve and for returning it to a normal position, a wheel having external and internal ratchets mounted on said shaft, the internal ratchets being engaged by the said pawl and the outside ratchets by a fixed pawl, the periphery of said wheel with the internal ratchets having raised type characters, a plurality of computing-disks connected with each other and with the last-mentioned wheel whereby the revolution of one, beginning with said last wheel will impart a one-tenth revolution to the next adjacent disk, a second set of computing-disks, a ratchet-wheel attached to the units-disk of said second series, a lever or arm carried by said sleeve having a dog which engages a single tooth of said ratchet-wheel at each oscillation of said sleeve, all of said disks having raised types, and means for taking a reading from a given row of types of said disks.

4. In an indicator and register, a shaft running longitudinally of the car having a combined rocking and longitudinal adjustment, said shaft having semi-annular ribs to form the teeth of a rack-bar, a register and indicator having rotary index-wheels and computing-disks, a bevel-wheel connected with said computing and index mechanism, a shaft having a bevel-pinion at one end engaging said bevel-wheel and a cog-wheel at the other end the teeth of which engage the teeth of the rack-bar.

5. In an indicator and register, a shaft having rocking and longitudinal adjustment and having a toothed portion to form a rack, a toothed wheel engaging said rack, a computing and registering mechanism and a shaft connecting said computing and registering mechanism with the toothed wheel of the rack.

6. In a fare indicator and register, the combination with suitable index-wheels and computing-disks, of a shaft having longitudinal adjustment and having teeth to form a rack and a handle to move said bar, said bar having a rocking movement, a spring to hold it in a normal locked position, a lock and means by moving the handle ninety degrees from the normal position of unlocking the shaft whereby it may be moved longitudinally to actuate the indicator and register mechanism.

In witness whereof I have hereunto set my hand and seal at Indianapolis, Indiana, this 22d day of October, A. D. 1902.

OTTO N. MOORE. [L. S.]

Witnesses:
JOSEPH A. MINTURN,
ROYDEN LESLEY.